US010303598B2

(12) United States Patent
Canepa et al.

(10) Patent No.: US 10,303,598 B2
(45) Date of Patent: *May 28, 2019

(54) MAP RECYCLING ACCELERATION

(71) Applicant: Seagate Technology LLC, Cupertino, CA (US)

(72) Inventors: Timothy Canepa, Los Gatos, CA (US); Leonid Baryudin, San Jose, CA (US); Stephen D. Hanna, Fort Collins, CO (US); Alex G. Tang, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,363

(22) Filed: Jun. 29, 2016

(65) Prior Publication Data
US 2016/0306577 A1    Oct. 20, 2016

Related U.S. Application Data

(63) Continuation of application No. 13/941,820, filed on Jul. 15, 2013, now Pat. No. 9,405,672.

(Continued)

(51) Int. Cl.
*G06F 12/02* (2006.01)
*G06F 3/06* (2006.01)
(Continued)

(52) U.S. Cl.
CPC .......... *G06F 12/0246* (2013.01); *G06F 3/064* (2013.01); *G06F 3/0608* (2013.01); *G06F 3/0613* (2013.01); *G06F 3/0619* (2013.01); *G06F 3/0652* (2013.01); *G06F 3/0656* (2013.01); *G06F 3/0658* (2013.01); *G06F 3/0679* (2013.01); *G06F 12/0802* (2013.01); *G06F 12/10* (2013.01); *G06F 2212/1032* (2013.01); *G06F 2212/1044* (2013.01);
(Continued)

(58) Field of Classification Search
None
See application file for complete search history.

(56) References Cited

U.S. PATENT DOCUMENTS

| 7,991,946 B2 | 8/2011 | Lee et al. ........................ 711/103 |
| 8,397,014 B2 | 3/2013 | Khmelnitsky et al. ....... 711/103 |

(Continued)

*Primary Examiner* — Sean D Rossiter
*Assistant Examiner* — Charles J Choi
(74) *Attorney, Agent, or Firm* — Hall Estill Attorneys at Law

(57) ABSTRACT

An apparatus includes a memory and a controller. The memory may be configured to store data. The controller may be configured to process a plurality of input/output requests to read/write to/from the memory. The controller generally includes a processor, a cache and a hardware assist circuit. The processor may be configured to initiate a recycle operation by generation of a start index. The cache may be configured to buffer a first level of a map and less than all of a second level of the map. The hardware assist circuit may be configured to search through the first level or any portions of the second level of the map in the cache in response to the start index, and notify the processor in response to the search detecting one or more blocks in the memory that contain valid data to be recycled.

20 Claims, 8 Drawing Sheets

Related U.S. Application Data

(60) Provisional application No. 61/838,974, filed on Jun. 25, 2013.

(51) Int. Cl.
  *G06F 12/0802* (2016.01)
  *G06F 12/10* (2016.01)

(52) U.S. Cl.
  CPC .. *G06F 2212/214* (2013.01); *G06F 2212/281* (2013.01); *G06F 2212/312* (2013.01); *G06F 2212/7205* (2013.01)

(56) References Cited

U.S. PATENT DOCUMENTS

| | | | |
|---|---|---|---|
| 2007/0204128 A1* | 8/2007 | Lee | G06F 12/0246 711/173 |
| 2008/0222491 A1 | 9/2008 | Lee et al. | 714/763 |
| 2009/0198952 A1* | 8/2009 | Khmelnitsky | G06F 12/0246 711/206 |
| 2010/0223433 A1* | 9/2010 | Ylonen | G06F 12/0253 711/154 |
| 2011/0072028 A1 | 3/2011 | Rousseau | 707/758 |
| 2011/0113191 A1* | 5/2011 | Pandya | G06F 17/30982 711/108 |
| 2011/0238886 A1* | 9/2011 | Post | G06F 12/0246 711/103 |
| 2012/0144090 A1 | 6/2012 | Song et al. | 711/102 |
| 2013/0019057 A1 | 1/2013 | Stephens | 711/103 |
| 2013/0097210 A1 | 4/2013 | Amit et al. | 707/813 |
| 2013/0166828 A1 | 6/2013 | Chun | 711/103 |
| 2013/0297856 A1* | 11/2013 | Sonoda | G06F 3/0625 711/103 |
| 2013/0326118 A1* | 12/2013 | Liao | G06F 12/0246 711/103 |
| 2013/0339659 A1 | 12/2013 | Bybell et al. | 711/207 |
| 2014/0325115 A1* | 10/2014 | Ramsundar | G06F 12/0238 711/102 |

\* cited by examiner

MAP RECYCLING ACCELERATION

This application relates to U.S. Ser. No. 13/941,820, filed Jul. 15, 2013, now U.S. Pat. No. 9,405,672, which relates to U.S. Provisional Application No. 61/838,974, filed Jun. 25, 2013, each of which are hereby incorporated by reference in their entirety.

FIELD OF THE INVENTION

The invention relates to solid-state drive controllers generally and, more particularly, to a method and/or apparatus for implementing map recycling acceleration.

BACKGROUND

To recycle data mapping structures or data structures, conventional controllers in solid-state drives follow a processor-intensive and time-consuming multi-step process to create a list of mapping structures or data structures to move prior to a block erasure operation. The list is created by either searching a physical erasure block for valid data or by searching a cached mapping structure for valid data located in the target erasure block.

To conventionally search the physical erasure block, the pages of the block within a flash device are read and a list of valid and stale candidates is created. A next step checks the candidates against a current first or prior level map for validity. The data associated with the valid entries is read from the flash device and moved to a new location within the same or another flash device. After the move is complete, the mapping structures are updated. Besides being slow, the conventional search techniques also consume appreciable bandwidth of the flash device to the detriment of a user.

To conventionally search a cached mapping structure for valid data located in the erasure block, each mapping entry is read and examined by a processor to look for a matching address of the erasure block to be recycled. The data associated with the valid entries is read from the flash device and moved to a new location within the same or another flash device. After the move is complete, the mapping structures are updated. If the mapping structures only have a single level of depth, the size of the map is large and the latter technique of searching the physical erasure block directly is more efficient and less disruptive to normal map operations.

SUMMARY

The invention concerns an apparatus including a memory and a controller. The memory may be configured to store data. The controller may be configured to process a plurality of input/output requests to read/write to/from the memory. The controller generally includes a processor, a cache and a hardware assist circuit. The processor may be configured to initiate a recycle operation by generation of a start index. The cache may be configured to buffer a first level of a map and less than all of a second level of the map. The hardware assist circuit may be configured to search through the first level or any portions of the second level of the map in the cache in response to the start index, and notify the processor in response to the search detecting one or more blocks in the memory that contain valid data to be recycled.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing map recycling acceleration that may (i) accelerate recycling of erasure candidate blocks, (ii) determine the presence of valid data without reading headers in the erasure candidate blocks, (iii) utilize a two-level map, (iv) implement a search of a first-level map in hardware only and/or (v) be implemented in one or more integrated circuits.

Embodiments of the present invention concern a solid-state drive (e.g., SSD) that recycles data location mapping structures along with user data and/or system data stored in flash memory to extend the life of the drive. The mapping structure generally comprises a first level and one or more second levels. Searching the large, packed, first-level map is accelerated using dedicated hardware logic that frees firmware (or software or code) executing in the controller to perform other tasks. The first-level map is cached in a low-latency memory. The second-level map pages are stored in long-latency nonvolatile memory, with some portion of the second-level map pages cached in low-latency memory. For the purpose of recycling, the second-level map pages are moved to new nonvolatile memory locations to extend the life of the drive. An example of a mapping structure is a flash translation layer.

Figure 1:
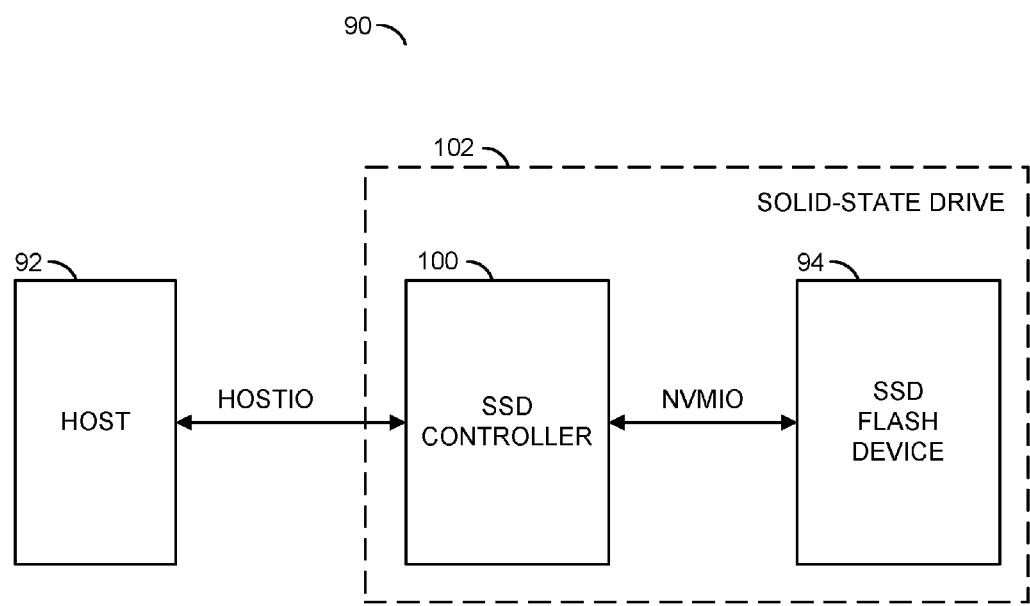
FIG. 1 is a block diagram of an example implementation of an apparatus.

Referring to FIG. 1, a block diagram of an example implementation of an apparatus 90 is shown. The apparatus (or circuit or device or integrated circuit) 90 implements a computer having a nonvolatile memory circuit. The apparatus 90 generally comprises a block (or circuit) 92, a block (or circuit) 94 and a block (or circuit) 100. The circuits 94 and 100 form a drive (or device) 102. The circuits 92 to 102 may represent modules and/or blocks that may be implemented as hardware, software, a combination of hardware and software, or other implementations.

One or more signals (e.g., HOSTIO) are exchanged between the circuit 92 and the circuit 100. The host input/output signal HOSTIO generally includes, but is not limited to, a logical address component used to access data in the circuit 102, a host command component that controls the circuit 102, a write data component that transfers write data from the circuit 92 to the circuit 100 and a read data component that transfers error corrected read data from the circuit 100 to the circuit 92. One or more signals (e.g., NVMIO) are exchanged between the circuit 100 and the circuit 94. The nonvolatile memory input/output signal NVMIO generally includes, but is not limited to, a physical address component used to access data in the circuit 94, a memory command component that controls the circuit 94 (e.g., read or write commands), a write codeword component that carries error correction coded and cyclical redundancy check protected write codewords written from the circuit 100 into the circuit 94 and a read codeword component that carries the error correction coded codewords read from the circuit 94 to the circuit 100.

The circuit 92 is shown implemented as a host circuit. The circuit 92 is generally operational to read and write data to and from the circuit 94 via the circuit 100. When reading or writing, the circuit 92 transfers a logical address value in the signal HOSTIO to identify which set of data is to be written or to be read from the circuit 94. The address generally spans a logical address range of the circuit 102. The logical address can address individual data units, such as SATA (e.g., serial-ATA) sectors.

The circuit 94 is shown implementing one or more nonvolatile memory circuits (or devices). According to various embodiments, the circuit 94 comprises one or more nonvolatile semiconductor devices. The circuit 94 is generally operational to store data in a nonvolatile condition. When data is read from the circuit 94, the circuit 94 accesses a set of data (e.g., multiple bits) identified by the address (e.g., physical address) in the signal NVMIO. The address generally spans a physical address range of the circuit 94.

The circuit 100 is shown implemented as a controller circuit. The circuit 100 is generally operational to control reading to and writing from the circuit 94. The circuit 100 comprises one or more integrated circuits (or chips or die) implementing the controller of one or more solid-state drives (e.g., SSD), embedded storage, or other suitable control applications.

Figure 2:
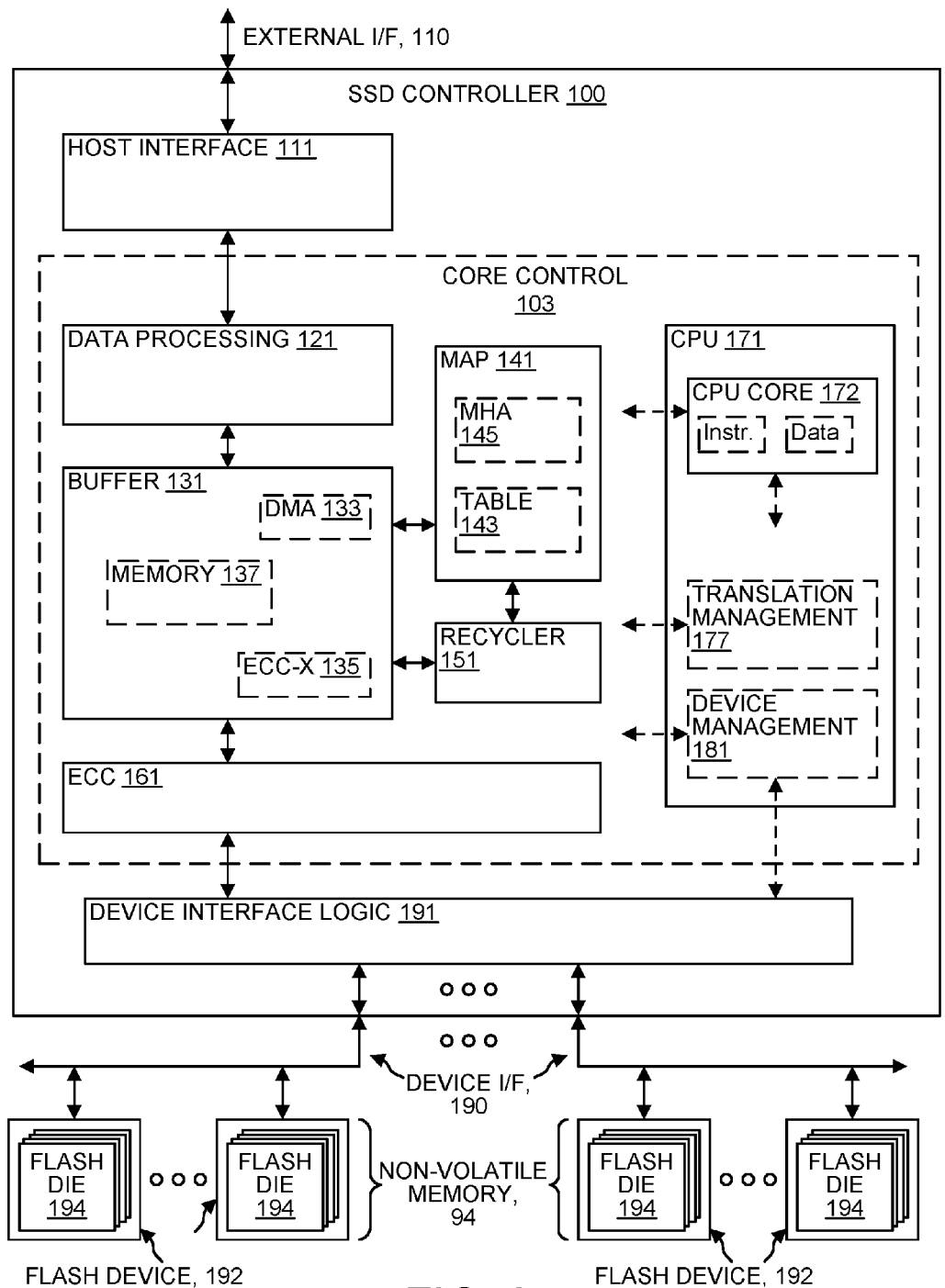
FIG. 2 is a diagram illustrating an example implementation of a controller circuit.

Referring to FIG. 2, a diagram illustrating an example implementation of the circuit 100 is shown. The circuit 100 generally comprises a block (or circuit) 103, a block (or circuit) 111 and a block (or circuit) 191. The circuit 103 generally comprises a block (or circuit) 121, a block (or circuit) 131, a block (or circuit) 141, a block (or circuit) 151, a block (or circuit) 161 and a block (or circuit) 171. The circuits 103 to 191 may represent modules and/or blocks that may be implemented as hardware, software, a combination of hardware and software, or other implementations.

The circuit 100 is shown coupled via one or more external interfaces 110 to the circuit 92 to exchange the signal HOSTIO. According to various embodiments, external interfaces 110 are one or more of: a serial advanced technology attachment (e.g., SATA) interface; a serial attached small computer system interface (e.g., serial SCSI or SAS interface); a (peripheral component interconnect express (e.g., PCIe) interface; a Fibre Channel interface; an Ethernet Interface (such as 10 Gigabit Ethernet); a nonstandard version of any of the preceding interfaces; a custom interface; or any other type of interface used to interconnect storage and/or communications and/or computing devices. For example, in some embodiments, the circuit 100 includes an SATA interface and a PCIe interface.

The circuit 100 is further shown coupled via one or more device interfaces 190 to circuit 94 via the signal NVMIO. The circuit 94 generally includes one or more storage devices, such as nonvolatile memory devices 192. According to various embodiments, device interfaces 190 are one or more of: an asynchronous interface; a synchronous interface; a double data rate (e.g., DDR) synchronous interface; an ONFI (e.g., open NAND flash interface) compatible interface, such as an ONFI 2.2 compatible interface; a toggle-mode compatible nonvolatile memory interface; a nonstandard version of any of the preceding interfaces; a custom interface; or any other type of interface used to connect to storage devices.

The nonvolatile memory devices 192 have, in some embodiments, one or more individual nonvolatile memory die 194. According to a type of a particular one of the nonvolatile memory devices 192, a plurality of nonvolatile memory die 194 in the particular nonvolatile memory device 192 are optionally and/or selectively accessible in parallel. The nonvolatile memory devices 192 are generally representative of one type of storage device enabled to communicatively couple to the circuit 100.

The circuit 100 may have one or more circuits, such as a host interface circuit 111, a data processing circuit 121, a buffer 131, a map 141, a recycler 151, an error-correcting code (e.g., ECC) circuit 161, a central processing unit (e.g., CPU) 171, and device interface logic 191. The specific circuits and interconnections illustrated in FIG. 2 are merely representative of one embodiment, and many arrangements and interconnections of some or all of the circuits, as well as additional circuits not illustrated, may be implemented to meet the design criteria of a particular implementation.

The host interface 111 sends and receives commands and/or data via the external interface 110, and, in some embodiments, tracks progress of individual commands. For example, the commands include a read command specifying an address, such as a logical block address (e.g., LEA), and an amount of data, such as a number of logical block address quanta (e.g., sectors), to read; in response, the circuit 102 provides read status and/or read data. For another example, the commands include a write command specifying an address (such as a logical block address) and an amount of data (such as a number of logical block address quanta, e.g., sectors) to write; in response, the circuit 102 provides write status and/or requests write data and optionally subsequently provides write status. In some embodiments, the host interface 111 is compatible with an SATA protocol.

According to various embodiments, one or more of data processing circuit 121 optionally and/or selectively processes some or all data sent between the buffer 131 and the external interfaces 110 and data processing circuit 121 optionally and/or selectively processes data stored in the buffer 131. In some embodiments, the data processing circuit 121 performs one or more of: encrypting; decrypting; compressing; decompressing; formatting; reformatting; transcoding; and/or any other data processing and/or manipulation task.

The buffer 131 stores data sent to/from the external interfaces 110 from/to the device interfaces 190. In some embodiments, the buffer 131 additionally stores system data, such as some or all map tables and/or journal entries, used by the circuit 100 to manage the nonvolatile memory devices 192. In various embodiments, the buffer 131 has one or more of: a memory 137 used for temporary storage of data; a direct memory access (e.g., DMA) circuit 133 used to control movement of data to and/or from the buffer 131; an ECC-X circuit 135 used to provide a higher-level error correction function; and other data movement and/or manipulation functions.

The map 141 converts between data addressing used on external interfaces 110 and data addressing used on device interfaces 190, using a table 143 and a map hardware assist (e.g., MHA) module 145 to map external data addresses to locations in the circuit 94. For example, in some embodiments, the map 141 converts logical block addresses used on the external interfaces 110 to block and/or page addresses targeting one or more flash die 194, via mapping provided by the table 143. For logical block addresses that have never been written since the drive manufacture or deallocation, the map data points to a default value to return if the logical block addresses are read. For example, when processing a deallocation command, the map data is modified so that entries corresponding to the deallocated logical block addresses point to one of the default values. In various embodiments, various default values generally exist, each having a corresponding pointer. The plurality of default values enables reading some deallocated logical block addresses (such as in a first range) as one default value, while reading other deallocated logical block addresses (such as in a second range) as another default value. The default values, in various embodiments, are defined by the flash memory, hardware, firmware, commands and/or primitive arguments and/or parameters, programmable registers, or various combinations thereof.

According to various embodiments, the table 143 is one or more of: a one-level map; a two-level map; a multi-level map; a map cache; a compressed map; any type of mapping from one address space to another; and any combination of the foregoing. According to various embodiments, the table 143 is stored in one or more of: static random access memory; dynamic random access memory; NVM (such as flash memory); cache memory; on-chip memory; off-chip memory; and any combination of the foregoing.

The map hardware assist module 145 is configured to access at least a first level and a second level of the map data. In some embodiments, the map hardware assist module 145 is configured to manage a second-level page cache (e.g., SPC) to facilitate lookups of second-level page cache slots with specific first-level map indices, install second-level page cache entries, lock the second-level page cache entries and unlock the second-level page cache entries.

A common approach for map recycling reads the headers contained in an erasure candidate block to extract a list of second-level map page headers. In various embodiments, the data containing the header information is read from flash, passed through an error correction unit, and subsequently post processed by hardware or software to extract the second-level map page headers. In some embodiments, the error correction unit employs a low-density parity check.

In the circuit 100, a check is performed of the headers in the first-level map index against the first-level map using the map hardware assist module 145. Valid second-level map pages are locked in the first-level map indices. The second-level map pages are subsequently recycled, the first-level map is updated and the locked first-level map indices are unlocked.

In some embodiments, the recycler 151 performs garbage collection. For example, in some embodiments, instances of a flash device 192 contain blocks that are erased before the blocks are re-writeable. The recycler 151 identifies which portions of a block contain valid data which should be moved, and which parts are not longer valid and so do not have to be moved. In various embodiments that utilize a flash translation layer, the determination of what data is valid is performed by consulting the flash translation layer directly. In still further embodiments, the headers stored in the block are read and a check is performed with the flash translation layer to determine if the data is valid.

The recycler 151 is enabled to determine which portions of the instances of the flash devices 192 are actively in use (e.g., allocated instead of deallocated), such as by scanning the map maintained by the map 141, and to make unused (e.g., deallocated) portions of the instances of the flash devices 192 available for writing by erasing the portions. In further embodiments, the recycler 151 is enabled to move data stored within instances of the flash devices 192 to make larger contiguous portions of the instances of the flash devices 192 available for writing.

In some embodiments, instances of the flash devices 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from the recycler 151 is written into a cold (less active) band. In some usage scenarios, if the circuit 92 writes a long, sequential stream, a size of the hot band grows, whereas if the computer 92 does random writes or few writes, a size of the cold band grows.

According to various embodiments, one or more of: the error correction code (e.g., ECC) circuit 161 optionally and/or selectively processes some or all data sent between the buffer 131 and the device interfaces 190; and the error correction code circuit 161 optionally and/or selectively processes data stored in the buffer 131. In some embodiments, the circuit 161 implements one or more of: a cyclic redundancy check (e.g., CRC) code; a Hamming code; a Reed-Solomon (e.g., RS) code; a Bose Chaudhuri Hocquenghem (e.g., BCH) code; a low-density parity check (e.g., LDPC) code; a Viterbi code; a trellis code; a hard-decision code; a soft-decision code; an erasure-based code; any error detecting and/or correcting code; and any combination of the preceding.

The circuit 171 controls various portions of circuit 100. The circuit 171 includes a central processing unit core 172. The core 172 is, according to various embodiments, one or more single-core or multi-core processors. The individual processor cores in the core 172 are, in some embodiments, multithreaded. The core 172 includes instruction and/or data caches and/or memories. For example, the instruction memory contains instructions to enable the core 172 to execute software (sometimes called firmware) to control the circuit 100. In some embodiments, some or all of the firmware executed by the core 172 is stored on the nonvolatile memory devices 192.

In various embodiments, circuit 171 further includes: a translation management module 177 to control the map 141 and a device management module 181 to control the device interface logic 191, and optionally other management modules. None, any, or all of the management functions performed by the circuit 171 are, according to various embodiments, controlled and/or managed by hardware, by software (such as firmware executing on core 172 or on a host connected via the external interfaces 110), or any combination thereof.

The device interface logic 191 controls the nonvolatile memory devices 192 via the device interfaces 190. The device interface logic 191 is enabled to send data to/from the nonvolatile memory devices 192 according to a protocol of the nonvolatile memory devices 192.

Figure 3:
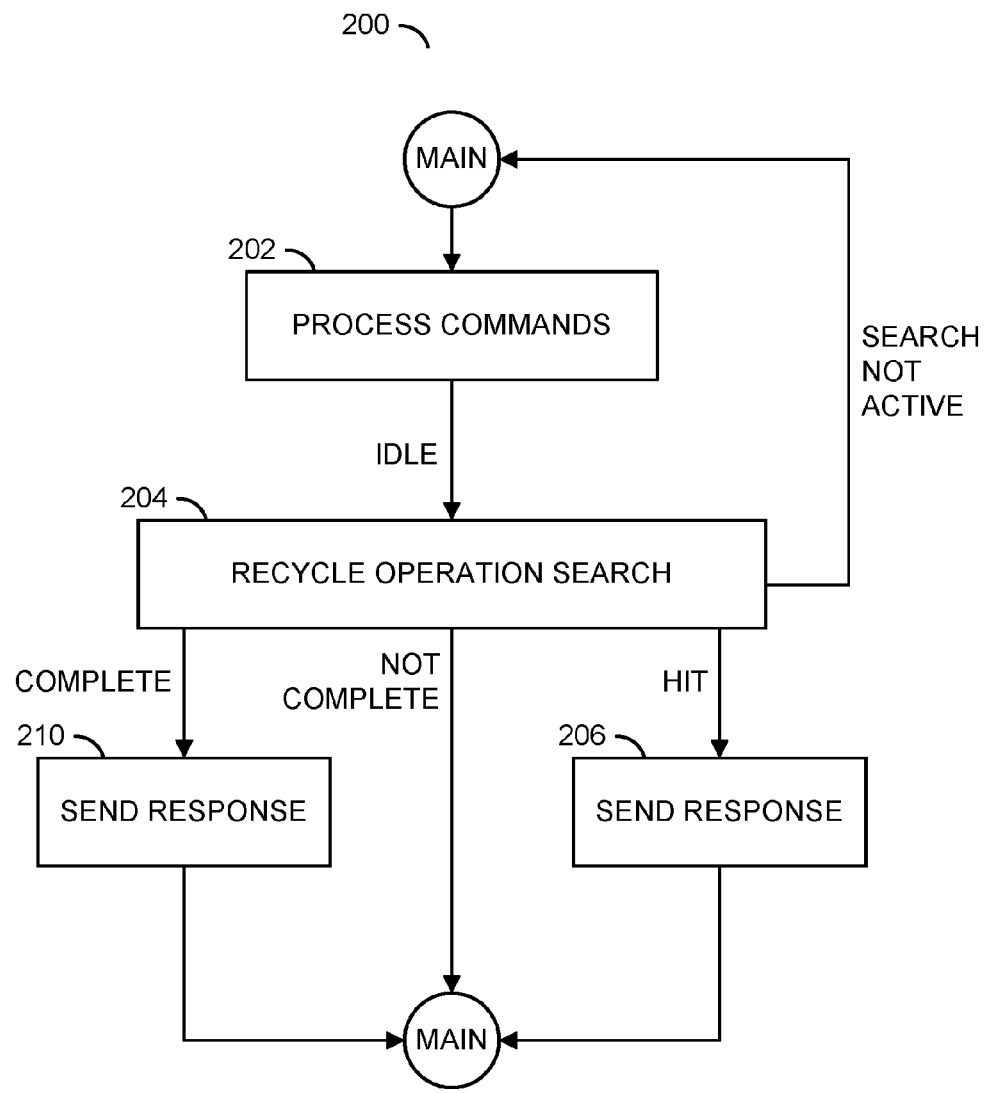
FIG. 3 is a flow diagram of a map recycle acceleration method in accordance with an embodiment of the invention.

Referring to FIG. 3, a flow diagram of a map recycle acceleration method 200 is shown in accordance with an embodiment of the invention. The method (or process) 200 is implemented by the circuit 100. The method 200 generally comprises a step (or state) 202, a step (or state) 204, a step (or state) 206 and a step (or state) 210. The steps 202 to 210 may represent modules and/or blocks that may be implemented as hardware, software, a combination of hardware and software, or other implementations.

To automate the map recycling process, a search function in hardware is implemented in the map hardware assist module 145 to automatically interleave a background search for map pages within an erasure (or source) block or blocks (e.g., a redundancy block being recycled) with normal priority map operations. When an erasure candidate block hit is detected, a second-level map page cache (e.g., SPC) location with a matching first-level map index is locked. A notification (or response) is returned to the circuit 171 with the flash address of the map page to move. The search has the option to continue beyond a programmable range if the cessation of map activity is longer than expected. Using the map hardware assist module 145 as a coprocessor generally accelerates the map recycling process, frees up an interface bandwidth to the circuit 94, and frees up processor memory and bandwidth for other functions or serves as a step toward processor consolidation to save on silicon.

The circuit 171 controls the search by setting a start index and a search range with a pre-assigned free second-level page cache slot entry to lock the matching first-level map index using field extensions to the current command headers. In the step 202, the circuits 171 and 145 process commands from the circuit 92 and/or the circuit 171 to access the circuit 94. Whenever a temporary cessation of map activity occurs (e.g., an IDLE transition), the search is started or resumed in the step 204. The search runs until a map hardware assist queue is emptied in response to a new command or a search range expiration (e.g., a NOT COMPLETE transition), an erasure block hit (e.g., a HIT transition) is detected or the search is completed (e.g., a COMPLETE transition).

If an erasure block hit is detected, a response is sent to the circuit 171 in the step 206 to process the hit. The response includes the nonvolatile address of the map page to move. The circuit 171 responds by moving the data from the erasure (or source) block to a destination block and updating the map accordingly. Optionally, the entire nonvolatile memory multi-plane page may be processed for any local active first-level map index. A second-level map (e.g., SLM) may be updated and copied to nonvolatile memory (e.g., inside the circuit 100 or the circuit 94).

Once the current search has completed, the circuit 145 sends a response in the step 210 to the circuit 171. After an erasure block hit or a search range expiration, the circuit 171 queues up a new search starting where the last search ended and progresses methodically across the entire first-level map.

In some embodiments, a search request is submitted to the circuit 145 similar to other map operations. The circuit 145 processes each request in the received order. The circuit 145 initiates the search operation based on the start index and the search range. If the search operation reaches the end of the search range without finding a hit and no other requests are pending, the search operation may continue past the search range to take advantage of the available bandwidth of the circuit 145.

Figure 4:
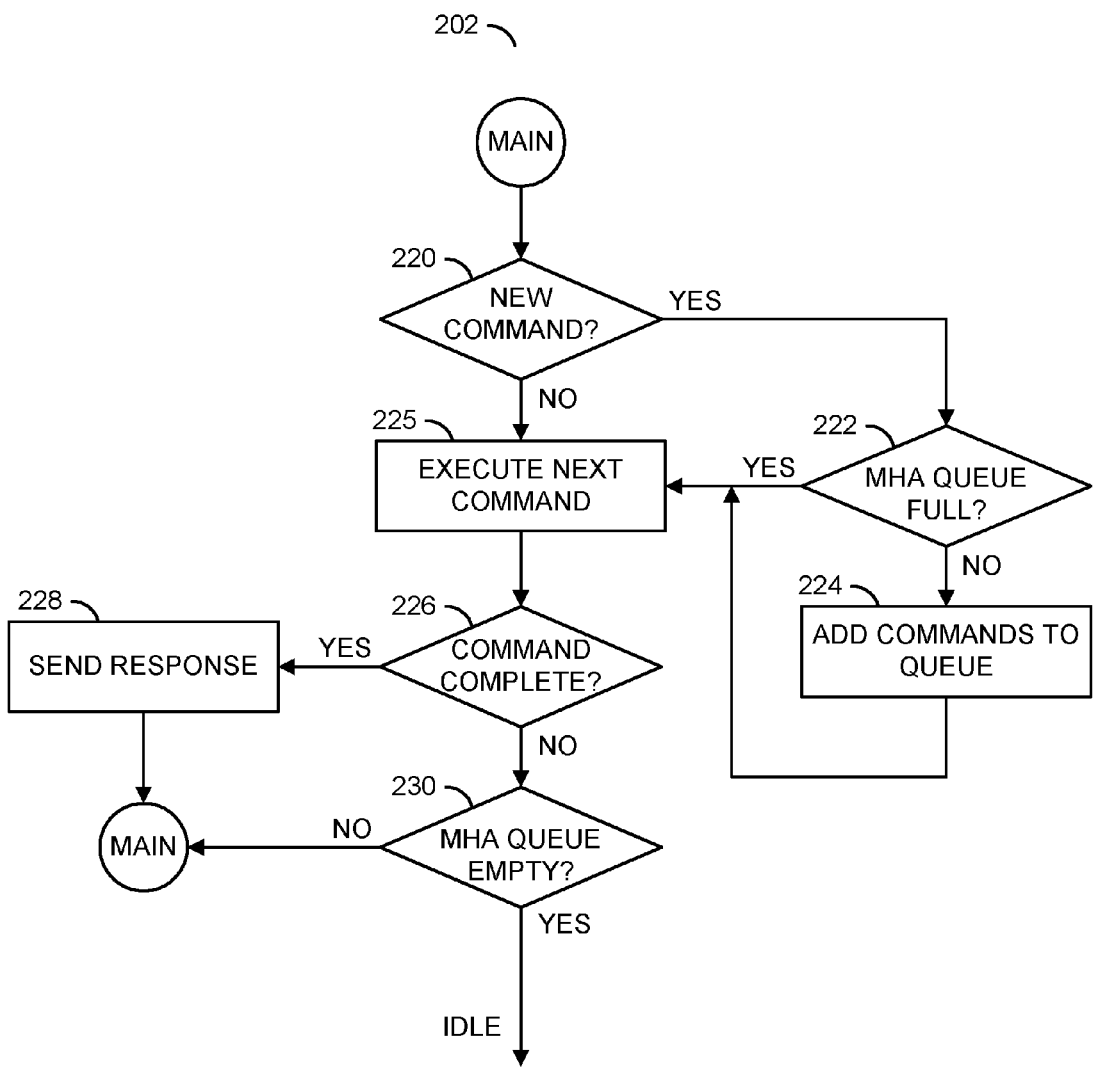
FIG. 4 is a flow diagram of an example implementation of a command processing step.

Referring to FIG. 4, a flow diagram of an example implementation of the step 202 is shown. The method (or process) 202 is implemented by the circuits 145 and 171. The method 202 generally comprises a step (or state) 220, a step (or state) 222, a step (or state) 224, a step (or state) 225, a step (or state) 226, a step (or state) 228 and a step (or state) 230. The steps 220 to 230 may represent modules and/or blocks that may be implemented as hardware, software, a combination of hardware and software, or other implementations.

In the step 220, a check is made by the circuit 171 by to determine if a new command is available for processing. If a new command has been received, a check of a fullness of a map hardware assist (e.g., MHA) queue is made in the step 222. If the map hardware assist queue is full, the new command is left pending in a queue in the circuit 171 until the map hardware assist queue has space. If room is available in the map hardware assist queue, the new command is added per the step 224.

If no new commands are detected in the step 220, the map hardware assist queue is full per the step 222 or the commands have been added to the map hardware assist queue in the step 224, the next command is executed by the circuit 145 in the step 225. A check is made in the step 226 to determine if processing of the command is complete. If the processing is complete, a message is returned from the circuit 145 to the circuit 171 in the step 228. Otherwise, the map hardware assist queue is checked again in the step 230. If one or more commands remain in the map hardware assist queue, the method 202 resumes and the next command is processed. If the map hardware assist queue is empty per the step 230, the IDLE transition signals the circuit 145 to initiate/continue searching the first-level map for valid data in a current erasure candidate block.

Figure 5:
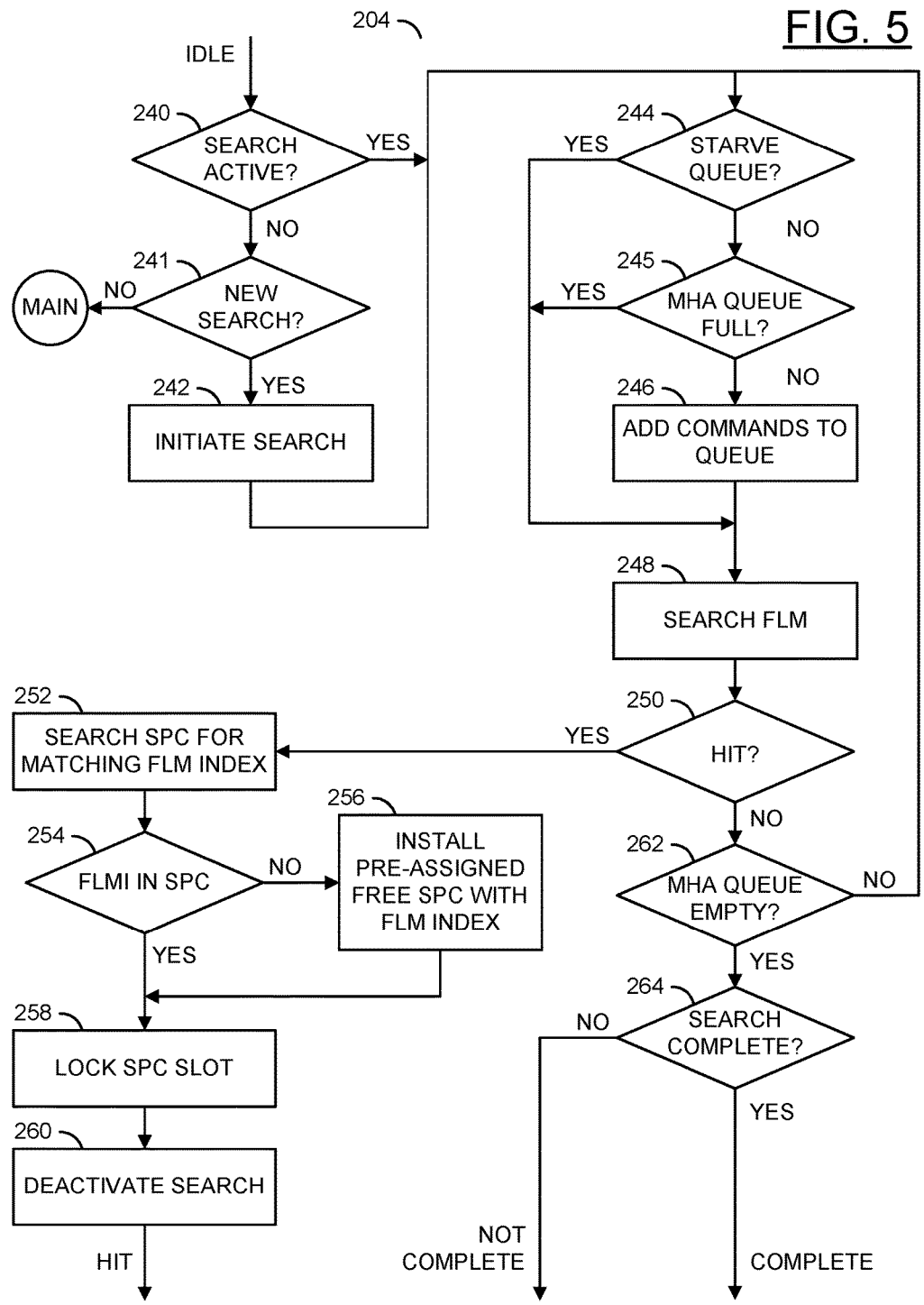
FIG. 5 is a flow diagram of an example implementation of a recycle operation step.

Referring to FIG. 5, a flow diagram of an example implementation of the step 204 is shown. The method (or process) 204 is implemented by the circuit 145. The method 204 generally comprises a step (or state) 240, a step (or state) 241, a step (or state) 242, a step (or state) 244, a step (or state) 245, a step (or state) 246, a step (or state) 248, a step (or state) 250, a step (or state) 252, a step (or state) 254, a step (or state) 256, a step (or state) 258, a step (or state) 260, a step (or state) 262 and a step (or state) 264. The steps 240 to 264 may represent modules and/or blocks that may be implemented as hardware, software, a combination of hardware and software, or other implementations. In some embodiments, the steps are implemented only in hardware.

In the step 240 a check is made to determine if a search is currently active. If no search is active, a check is performed at the step 241 to determine if a new search should be started. If true, the new search may be initiated in the step 242. Otherwise, the search operation (e.g., step 204) is ended as not active.

If a search is already active, a check is made in the step 244 to determine if the map hardware assist queue should be starved due to a new command from the circuit 171 or the search range has expired. If the circuit 171 has one or more new CPU commands, the new commands are not immediately added to the map hardware assist queue. The search subsequently continues in a loop around the steps 248, 250, 262 and 244 until the map hardware assist queue is empty (or starved). Therefore, the current search commands are not mixed with outstanding CPU commands. If the search range expires, new commands are not immediately added to the map hardware assist queue. The search subsequently continues in the loop around the steps 248, 250, 262 and 244 until the map hardware assist queue is empty. If a redundancy block hit is detected in the step 250, processing of the hit is allowed to complete.

If one or more additional commands are available in the step 244 that do not cause the map hardware assist queue to be starved, a check is performed in the step 245 to determine if space is available in the map hardware assist queue for the commands. If no space is available in the queue, the search proceeds with the step 248 and the additional commands are held in the queue in the circuit 171. Once space is available in the map hardware assist queue, the new commands are added to the map hardware assist queue in the step 246.

Once the current search has been initiated and new commands have been handled, a search of the first-level map to determine if the current erasure candidate block(s) contain valid data is performed by the circuit 145 in the step 248. The circuit 145 is used to manage a second-level page cache so facilities are provided in the circuit 145 to lookup the second-level page cache slots with a specific first-level map index, installing a second-level page cache entry, and locking of the second-level page cache entry. When the circuit 145 finds a first-level map entry that matches the current redundancy block (e.g., a hit) in the step 250, the first-level map entry is checked with the second-level page cache to determine if a second-level page cache slot already contains the second-level map page (e.g., SLM page) corresponding to the search hit or uses the pre-assigned slot to lock the first-level map index.

Use of the circuit 145 to check the first-level map search hit against the second-level page cache minimizes firmware processing in the circuit 171 and saves interface bandwidth to the circuit 94. Otherwise, the firmware has to schedule and read all blocks in the band to obtain lists of candidate first-level map indices and check each first-level map index for validity. Furthermore for each valid first-level map index found, a separate request would incur an extra check against the first-level map again in case the first-level map entry in question may have changed because the first-level map search and the second-level page cache check are not atomic. Using the circuit 145 to sequence the first-level map search and the second-level page cache check via hardware causes the two operations to be atomic.

The second-level page cache check is performed in the step 252. If a second-level page cache slot is not found with the matching first-level map index per the step 254, a preassigned free second-level page cache is installed with the first-level map index in the step 256. If a second-level page cache slot is found with the matching first-level map index, the second-level page cache slot is locked in the step 258. A notification of the hit is sent in the step 260 from the circuit 145 to the circuit 171 and the search is deactivated.

The circuit 145 generally keeps a lock bit(s) per second-level page cache slot. In some embodiments, each lock contains a separate lock bit that distinguishes how the second-level page cache slot was locked. Thus, the first-level map search hit results can be passed to the firmware in the circuit 171 with the second-level page cache slot number. If the second-level page cache check operation results in not finding a matching first-level map index, the circuit 145 could install a preassigned second-level page cache slot with the first-level map index from the first-level map search per the step 256. The preassign mechanism is referred to as a "speculative-add" of the second-level page cache slot. Therefore, when the firmware receives a first-level map search hit, a locked second-level page cache slot is always associated with the hit.

Upon receiving the first-level map search hit results, the firmware in the circuit 171 continues with the map page recycling. The page is subsequently moved by the recycler 151 to a new location as part of the recycling process.

If no redundancy block hit is detected per the step 250, another check of the map hardware assist queue is performed in the step 262. If the queue is not empty, the search continues with the step 244 to keep checking for interrupts and to add new search commands. If the queue is empty, a determination is made in the step 264 whether the current search is complete. If not, the NOT COMPLETE transition is signaled.

Figure 6:
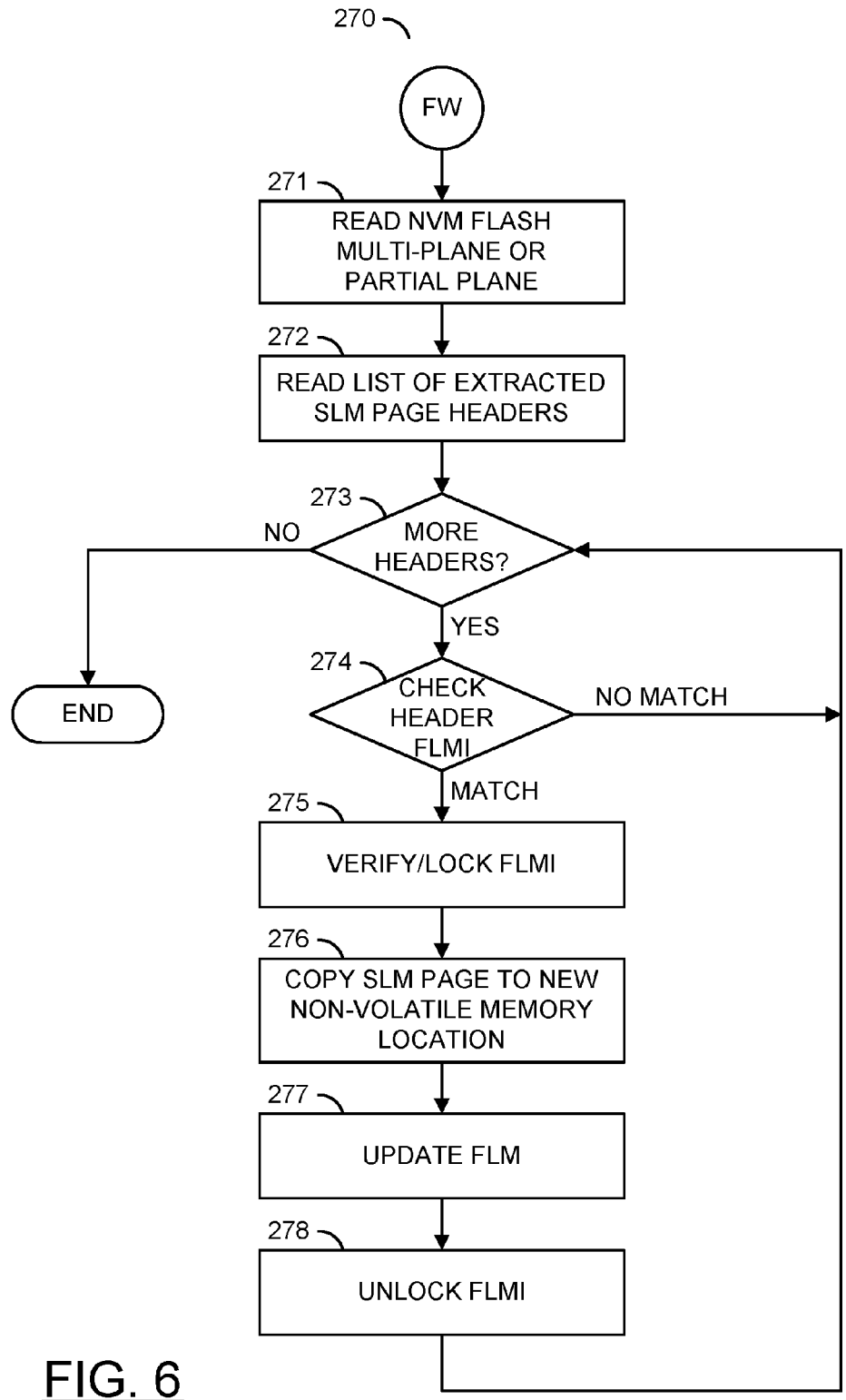
FIG. 6 is a flow diagram of an example method for hit processing.

Referring to FIG. 6, a flow diagram of an example method 270 for hit processing is shown. The method (or process) 270 is performed by the circuit 171. The method 270 generally comprises a step (or state) 271, a step (or state) 272, a step (or state) 273, a step (or state) 274, a step (or state) 275, a step (or state) 276, a step (or state) 277 and a step (or state) 278. The steps 271 to 278 may represent modules and/or blocks that may be implemented as hardware, software, a combination of hardware and software, or other implementations. In some embodiments, the steps are implemented only in firmware.

In the step 271, a multi-plane or partial plane of the nonvolatile flash is read. A list of extracted second-level map page headers is read in the step 272. A check is performed in the step 273 to determine if more headers remain to be processed. If no more headers remain unprocessed, the method 270 ends. If more headers are available, a check is made in the step 274 for a match of the header in the first-level map indices. If no match is found, a next header is checked in the step 273. If a match is found, the first-level map index is verified and locked in the step 275.

In the step 276, the second-level map page is copied to a new nonvolatile memory location. The first-level map is updated in the step 277 to account for the copy. The first-level map index is unlocked in the step 278. The method 270 returns to the step 273 to check for more headers. Processing of the headers around the steps 274 to 278 continues until all of the headers have been examined.

Figure 7:
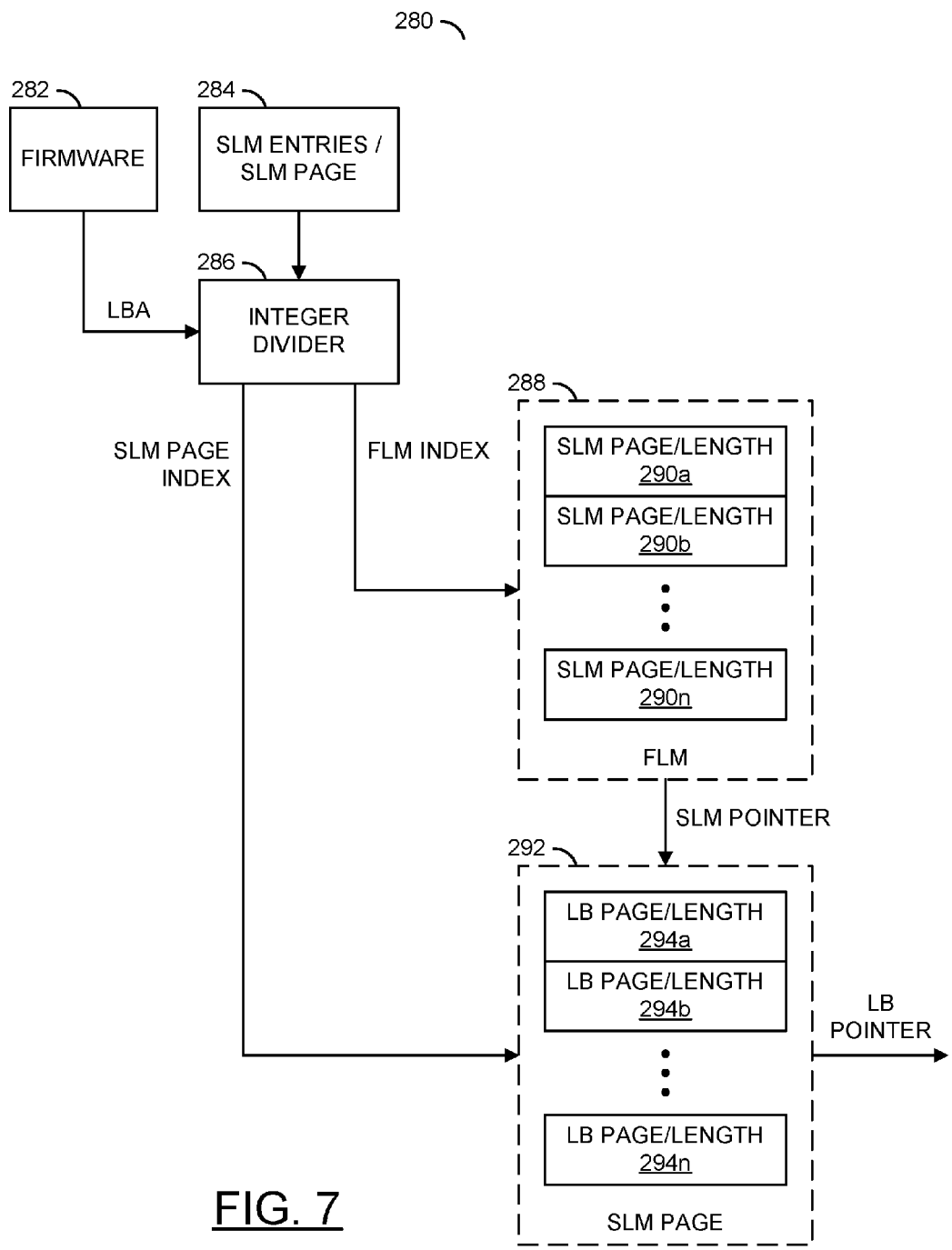
FIG. 7 is a block diagram of an example method for mapping a logical block address to a logical block pointer.

Referring to FIG. 7, a block diagram of an example method 280 for mapping a logical block address to a logical block pointer is shown. The method (or process) 280 is performed by the circuits 141 and 171. The method 280 generally comprises a step (or state) 280, a step (or state) 282, a step (or state) 284, a step (or state) 286, a step (or state) 288, a step (or state) 290 and a step (or state) 292. The steps 280 to 292 may represent modules and/or blocks that may be implemented as hardware, software, a combination of hardware and software, or other implementations. In some embodiments, the steps are implemented only in hardware.

In the step 282, the firmware executing in the circuit 171 provides a logical block address (e.g., LBA) to the circuit 145. Second-level map entries and second-level map page parameters are written into programmable registers of the circuit 145 in the step 284. An integer division of the logical block address is performed in the step 286 based on the parameters stored in the registers in the step 284. A quotient of the division establishes a first-level map index value. A remainder of the division forms a second-level map page index. In some embodiments, the divider step 286 is coupled to the first-level map and the second-level map pages. In other embodiments, some or all of the process of mapping logical block addresses, such as the divider step 286, is implemented (e.g., in firmware or software) executing in the circuit 171.

A mapping of the logical block addresses to the logical blocks stored in the circuit 94 is a two-level map having a first-level map and one or more second-level map pages. The two-level map is implemented via a first-level map element 288 coupled to one or more second-level map elements 292. The first-level map 288 includes a plurality of entries 290a-290n. Each entry 290a-290n contains information about a corresponding second-level map page and length (e.g., SLM Page/Length 290a ..., SLM Page/Length 290n). Each entry 290a-290n of the first-level map 288 points to a respective one of the second-level map pages (such as the second-level map page 292).

The second-level map page 292 includes a plurality of entries 294a-294n. Each entry 294a-294n contains information about a corresponding logical block (e.g., LB) page and length (e.g., LB Page/Length 294a, . . . , LB Page/Length 294n). Each entry 294a-294n points to a location in the circuit 94 where data begins (e.g., a read unit storing at least the beginning of host write data for a logical block address).

The quotient (e.g., FLM INDEX) is used to select one of the first-level map entries, and a page field of the selected first-level map entry is read as a second-level map pointer (e.g., SLM POINTER). The page field is used to select one of the second-level map pages (e.g., LB page 294a), and the remainder (e.g., SLM PAGE INDEX) is used (e.g., as an offset) to select an entry of the selected second-level map page.

A page field of the selected second-level map page entry is used to select a particular location in the circuit 94, such as a particular read unit, where at least the beginning of the logical block corresponding to the presented logical block address is stored via the logical block pointer (e.g., LB POINTER). In various embodiments, the logical block pointer includes an address of a read unit of the circuit 94. In some embodiments, each of the second-level map entry includes a length field (e.g., encoding size and/or span) indicating how many read units are read to obtain all of the data for the logical block and/or where within a read unit data the logical block begins. In some embodiments, each of the first-level map entries includes a length field (e.g., encoding size and/or span) indicating how many read units to read to obtain all of the respective second-level map pages specified by a page field of the first-level map entry.

In various embodiments, FIG. 7 is illustrative of selected details of or related to the map 141 and/or the table 143 of FIG. 2. For example, in some embodiments, the map 141 and/or the table 143 implement one or more caches of mapping information, such as one or more entries of a first-level map and/or one or more pages and/or entries of a second-level map. An entire image of the first-level map and/or the second-level map is maintained in a portion of nonvolatile memory (e.g., the circuit 94), updated, for example, when the caches replace a previously cached first-level map and/or second-level map page. In some embodiments, the first-level map and/or the second-level map entire images are implemented via rolling or ping-pong checkpoints, each checkpoint being at least a portion of the respective entire map image.

In various embodiments, the quotient is used as a key to access a cache, such as a fully associative cache of the second-level map pages. If a hit occurs in the cache for a particular second-level map page, a latest copy of the particular second-level map page is found in the cache without accessing the circuit 94. Providing fast access to a plurality of second-level map pages enables, in some embodiments and/or usage scenarios, results in more efficient processing of multiple independent streams of sequential data accesses to the circuit 94 (e.g., a stream of sequential data accesses to a region of logical block addresses interspersed with another stream of sequential data accesses to another region of logical block addresses).

In some embodiments, a logical block address (or a logical page number portion thereof) is divided (by an integer divider) using a specified divisor into the quotient and the remainder. The specified divisor is according to a number of second-level map entries per second-level map page. The quotient is an index in the first-level map of a particular first-level map entry associated with the logical page address. The particular first-level map entry specifies a physical location of a corresponding second-level map page. The remainder is an index in the corresponding second-level map page of a particular second-level map entry. The particular second-level map entry specifies a physical location and/or other information of data associated with the logical block address. In further embodiments in which at least a portion of the second-level map pages are cached and/or shadowed in a random access memory of the circuit 100, the first-level map index is used, at least in part, to locate the cached and/or shadowed copy, if any, of the corresponding second-level map page, such as via a direct array access or via a hash table.

Figure 8:
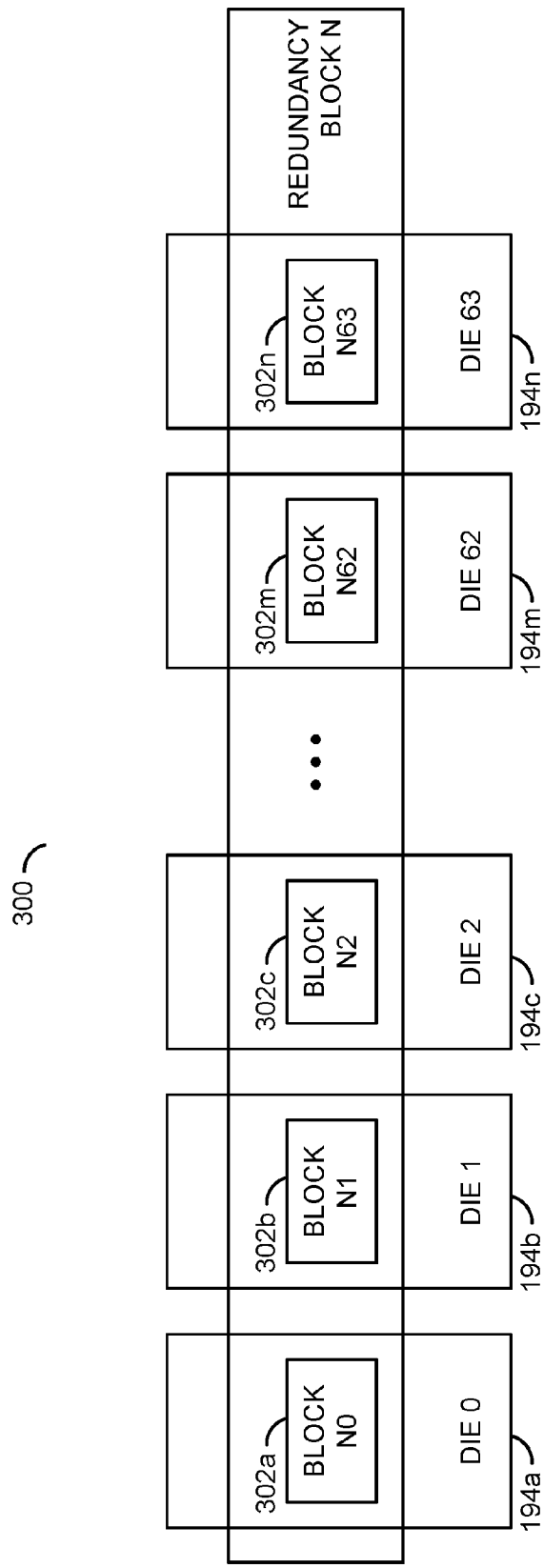
FIG. 8 is a block diagram of an example redundancy block N.

Referring to FIG. 8, a block diagram of an example redundancy block N 300 is shown. The redundancy block N generally comprises the blocks (or units) 302a-302n (e.g., N0-N63). Each block 302a-302n is generally fabricated on a different die 194a-194n (e.g., Die 0-Die 63) in the circuit 94. In some situations, the redundancy block N may have a fewer number of blocks 302a-302n than the number of dies 194a-194n. In other situations, the redundancy block N may have a larger number of blocks 302a-302n than the number of dies 194a-194n.

By using the redundancy block N as the allocated granularity, the circuit 100 provides a fault tolerant capability that allows for the loss of one or more blocks 302a-302n (or the corresponding die 194a-194n). The circuit 100 is operational to generate redundant information (e.g., parity information) as at least a portion of the data being stored in the redundancy block N. The redundant information generally allows reconstruction of the data in the event that one or more of the blocks 302a-302n fail and/or loses power. The data reconstruction may be similar to the reconstruction in a redundant array of independent disk (e.g., RAID) hard disk drives. The redundant information is stored in one or more of the blocks 302a-302n of the redundancy block N. The fault tolerance of the redundant information may be adjustable. For example, a single redundant block (e.g., 302a) may be used to store redundant information sufficient to recover from the loss of a single block 302b-302n. Two redundant blocks (e.g., 302a-302b) may be used to recover from the loss of two blocks 302c-302n. Where the redundant information is a mirror copy of the data (e.g., RAID 1), half the blocks 302a-302n may store the data and the other half may store the mirrored copy of the data. The redundant data can be used by the circuit 100 when recovering pages containing possible partially written data.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a memory configured to store data; and
 a controller circuit configured to process a plurality of input/output requests to read/write to/from the memory, the controller circuit comprising
  a processor configured to initiate a recycle operation by generation of a start index,
  a cache
   having a plurality of cache slots, and
   configured to buffer a first level of a map and less than all of a second level of the map copied from the memory, and
  a hardware assist circuit configured to
   search through the first level of the map in the cache to identify one or more first level indices in the first level of the map that correspond to erasure candidate blocks in the memory that contain valid data in response to the start index providing one or more identified first level indices,
   search through the second level of the map in the cache to identify one or more of the cache slots holding a cached second level page of the second level of the map that corresponds to the one or more identified first level indices,
   install in the cache a preassigned cached second level page corresponding to each of the one or more identified first level indices in response to finding no corresponding cached second level pages,
   lock the one or more of the cache slots holding the cached second level pages that correspond to the one or more identified first level indices providing one or more locked cache slots;
   notify the processor of the erasure candidate blocks to move during the recycle operation in response to detecting one or more blocks in the memory that contain the valid data to be recycled, and
   unlock the one or more locked cache slots holding the cached second level pages after the second level pages in the erasure candidate blocks have been moved to different locations in the memory.

2. The apparatus according to claim 1, wherein the valid data includes map data to be recycled in response to the notification.

3. The apparatus according to claim 2, wherein the map data to be recycled is from the second level of the map.

4. The apparatus according to claim 2, wherein the map data to be recycled is from a third level of the map.

5. The apparatus according to claim 1, wherein the hardware assist circuit is implemented solely in dedicated hardware.

6. The apparatus according to claim 1, wherein the processor is further configured to lock one or more of the cache slots in the cache that buffer the one or more identified first level indices during the recycle operation.

7. The apparatus according to claim 1, wherein the hardware assist circuit is further configured to suspend the recycle operation while servicing a new command to access the memory.

8. The apparatus according to claim 1, wherein the processor is further configured to
 update one or more pages of the second level in the cache in response to the recycle operation, and
 copy the one or more pages of the second level as updated from the cache to the memory.

9. The apparatus according to claim 1, wherein the memory and the controller circuit form part of a solid-state drive.

10. A method for map recycling acceleration, comprising:
 processing a plurality of input/output requests to read/write to/from a memory;
 initiating a recycle operation by generation of a start index using a processor;

buffering a first level of a map and less than all of a second level of the map copied from the memory in a cache having a plurality of cache slots;

searching through the first level of the map in the cache to identify one or more first level indices in the first level of the map that correspond to erasure candidate blocks in the memory that contain valid data using a hardware assist circuit in response to the start index providing one or more identified first level indices;

searching through the second level of the map in the cache to identify one or more of the cache slots holding a cached second level page of the second level of the map that corresponds to the one or more identified first level indices using the hardware assist circuit;

installing in the cache a preassigned cached second level page corresponding to each of the one or more identified first level indices in response to finding no corresponding cached second level pages using the hardware assist circuit;

locking the one or more of the cache slots holding the cached second level pages that correspond to the one or more identified first level indices providing one or more locked cache slots using the hardware assist circuit;

notifying the processor of the erasure candidate blocks to move during the recycle operation in response to detecting one or more blocks in the memory that contain the valid data to be recycled using the hardware assist circuit; and unlocking the one or more locked cache slots holding the cached second level pages after the second level pages in the erasure candidate blocks have been moved to different locations in the memory using the hardware assist circuit.

11. The method according to claim 10, wherein the valid data includes map data to be recycled in response to the notification.

12. The method according to claim 11, wherein the map data to be recycled is from the second level of the map.

13. The method according to claim 11, wherein the map data to be recycled is from a third level of the map.

14. The method according to claim 10, wherein the searching is implemented solely in dedicated hardware.

15. The method according to claim 10, further comprising:
locking one or more of the cache slots in the cache that buffer the one or more identified first level indices during the recycle operation.

16. The method according to claim 10, further comprising:
suspending the recycle operation while servicing a new command to access the memory.

17. The method according to claim 10, further comprising:
updating one or more pages of the second level in the cache in response to the recycle operation; and
copying the one or more pages of the second level as updated from the cache to the memory.

18. The method according to claim 10, wherein the method is performed in a solid-state drive.

19. An apparatus comprising:
an interface circuit configured to process a plurality of read/write operations to/from a memory; and
a control circuit comprising
a processor configured to initiate a recycle operation by generation of a start index,
a cache
having a plurality of cache slots, and
configured to buffer a first level of a map and less than all of a second level of the map copied from the memory, and
a hardware assist circuit configured to
search through the first level of the map in the cache to identify one or more first level indices in the first level of the map that correspond to erasure candidate blocks in the memory that contain valid data in response to the start index providing one or more identified first level indices,
search through the second level of the map in the cache to identify one or more of the cache slots holding a cached second level page of the second level of the map that corresponds to the one or more identified first level indices,
install in the cache a preassigned cached second level page corresponding to each of the one or more identified first level indices in response to finding no corresponding cached second level pages,
lock the one or more of the cache slots holding the cached second level pages that correspond to the one or more identified first level indices providing one or more locked cache slots;
notify the processor of the erasure candidate blocks to move during the recycle operation in response to detecting one or more blocks in the memory that contain the valid data to be recycled, and
unlock the one or more locked cache slots holding the cached second level pages after the second level pages in the erasure candidate blocks have been moved to different locations in the memory.

20. The apparatus according to claim 19, wherein the interface circuit and the control circuit form part of a solid-state drive controller.

* * * * *